United States Patent [19]

Barger et al.

[11] 4,081,650
[45] Mar. 28, 1978

[54] AUTOMATIC SEAL WELDING APPARATUS

[75] Inventors: John Joseph Barger, Ringgold, Ga.; Milton Lee Blevins, Chattanooga; Dennis Edward Savor, Hixson, both of Tenn.

[73] Assignee: Combustion Engineering, Inc., Windsor, Conn.

[21] Appl. No.: 729,248

[22] Filed: Oct. 4, 1976

[51] Int. Cl.² .............................................. B23K 9/02
[52] U.S. Cl. ................................ 219/60 A; 219/125.11
[58] Field of Search ............ 219/125 R, 60 A, 125 PL

[56] References Cited

U.S. PATENT DOCUMENTS

| 3,675,841 | 7/1972 | Gutlhubor | 219/125 R |
| 3,841,547 | 10/1974 | Bartley | 219/125 R |

FOREIGN PATENT DOCUMENTS

| 1,221,642 | 1/1960 | France | 219/125 R |
| 1,123,187 | 10/1968 | U.S.S.R. | 219/125 R |

Primary Examiner—E. A. Goldberg
Attorney, Agent, or Firm—Edward L. Kochey, Jr.

[57] ABSTRACT

An apparatus for automatically seal welding a tube to the inside surface of a header. A mandrel concentrically supports the apparatus from the tube to be welded and carries a rotating support which in turn carries a welding torch. Electric motors for rotating and oscillating the torch are located with their axis parallel to that of the mandrel. Weld spatter shields protect the interior of the tube and also the various drive mechanisms.

5 Claims, 3 Drawing Figures

AUTOMATIC SEAL WELDING APPARATUS

BACKGROUND OF THE INVENTION

This invention relates to automatic welding machines and in particular to an apparatus for seal welding tubes to the internal surface of a header.

Water tube boilers are formed of headers in the order of 16 inch outside diameter with tubes in the order of 2 inch outside diameter attached thereto. These tubes are attached on many occasions by using rolled joints. In this process tube drillings are supplied to accept the tubes and 4 inch handholes are supplied on the opposite side of the header at 15 inch intervals. The tube is placed through the hole extending slightly inside the header, and tube rolling equipment passed in through the handhole is used to roll and expand the tube into the joint. This forms the strength joint and also generally a leak-tight joint.

It is sometimes desirable to seal weld these tubes to the internal surface of the header when leaks develop or when the possibility of leaks is to be minimized. Because of the limited visibility and difficult access it is impractical to make effective seal welds on these tubes. The restricted size of the access openings and the limited space within the header precludes the use of conventional automatic welding equipment.

The apparatus of my invention is compactly arranged and organized to permit its introduction through the small handhole openings and its use within the restricted environment inside a header. The tube end may, therefore, be effectively and automatically seal welded to the inside surface of the header.

DESCRIPTIION OF THE PREFERRED EMBODIMENT

Figure 1:
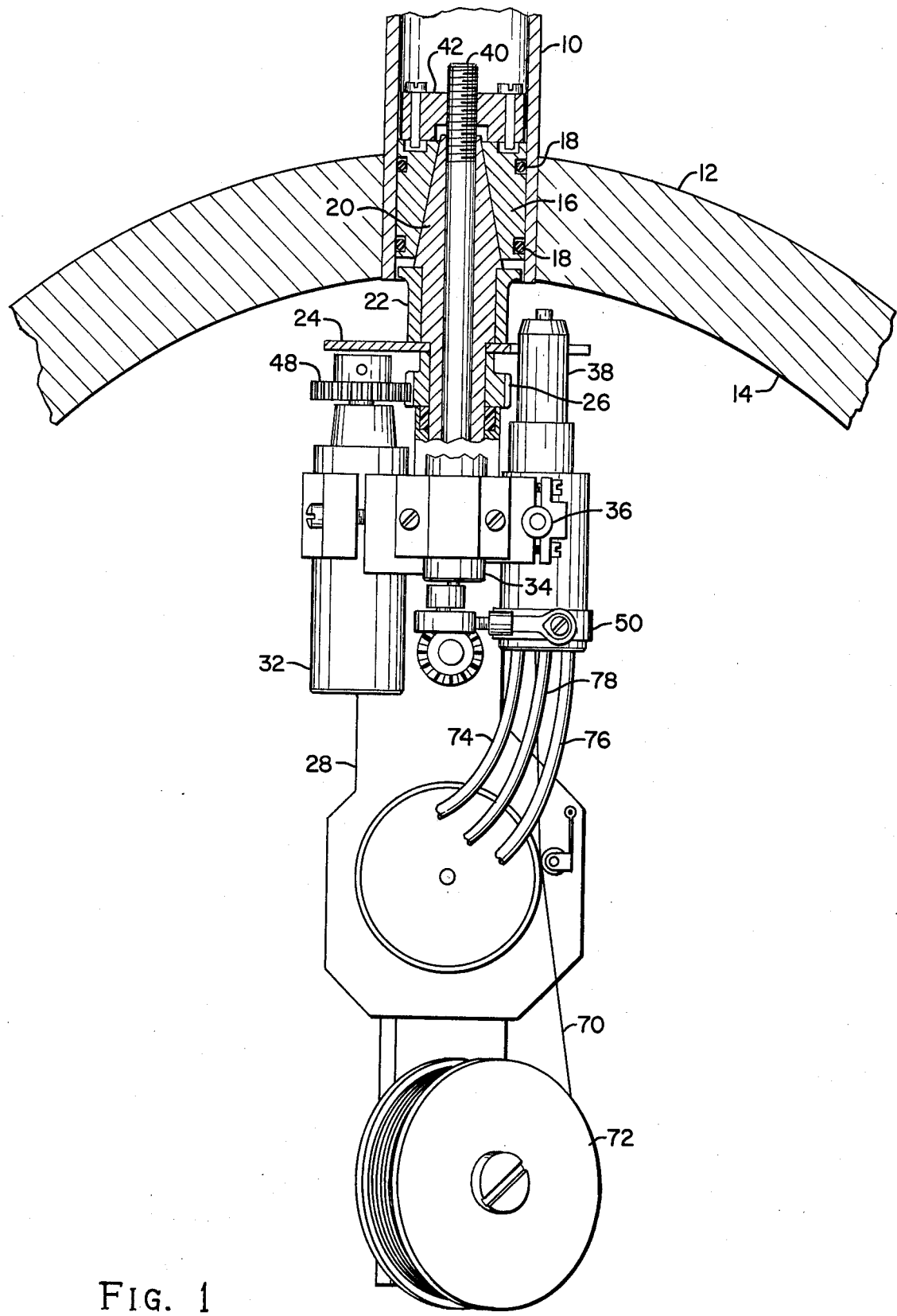
FIG. 1 is a partial sectional view of the apparatus of my invention.
Figure 2:
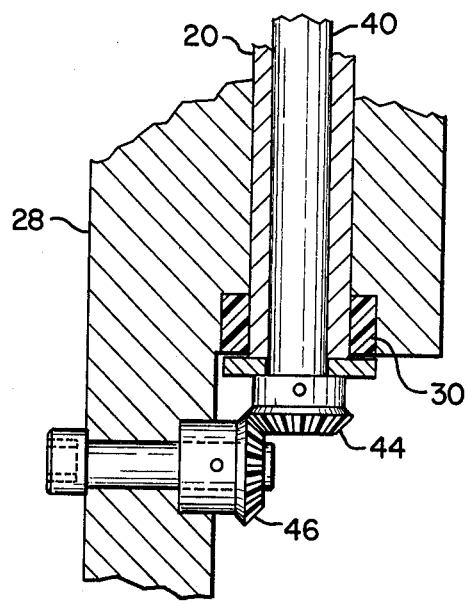
FIG. 2 is a detail of the tightening thrust path.
Figure 3:
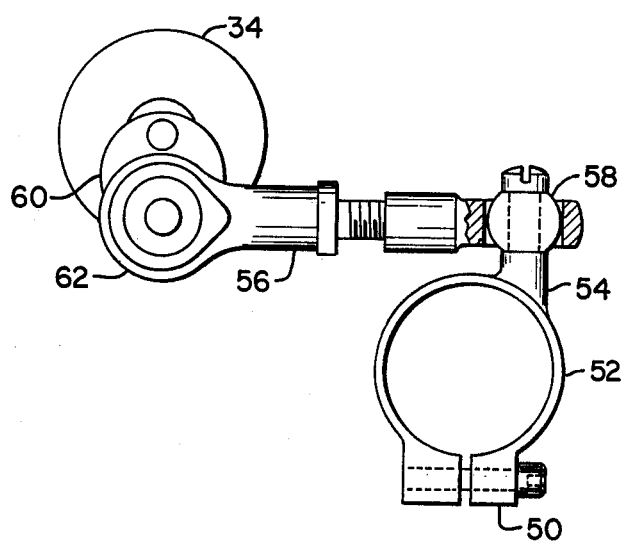
FIG. 3 is a detail of the torch oscillating arrangement.

Tube 10 is to be seal welded to header 12 at the inside surface 14. While the apparatus of my invention is illustrated in welding position, it should be understood that the assembly of the apparatus is accomplished outside of the header and the completed assembly passed through handhole openings and installed at the illustrated location.

Clamp jaws 16 are formed of three separate 120° segments held together as a unit by two (2) O-rings 18, which hold the jaws together but permit radial expansion. Tapered mandrel 20 fits within a mating tapered inside diameter of the clamp jaws in such a manner as to avoid relative rotation of the two components.

An inner spatter shield 22 is formed as a cylindrical annular disc with an outside disc diameter less than the inside diameter of the tube. This abuts a shoulder on the mandrel so that it is located in the area to be welded and operates to protect the inside diameter of the tube from weld spatter. This shield may be either fixed to the shaft or allowed to rotate as desired.

An outer spatter shield 24 in the form of an annular disc surrounds the mandrel and has a radial slot through which the welding torch passes. This shield is mounted so as to be allowed to rotate freely around the shaft.

A sun gear 26 is rigidly mounted on the mandrel 20. A weld head body 28 is mounted on the mandrel 20 in a manner that is free to rotate about the mandrel. This is accomplished with the aid of Teflon bearings 30, one of which is shown in the breakaway portion of FIG. 1 and one of which is hidden but located on the lower end of mandrel 20. This weld head body is a support structure which carries the rotation motor 32, the oscillator motor 34, and the journal bearing 36 which in turn supports the torch 38. These three supported elements are circumferentially displaced from one another around the axis of the mandrel so that they may be all located within a 4 inch diameter circle. This permits the equipment to be passed in through an opening of that size into a header.

The mandrel is concentrically supported from the tube to be seal welded with the aid of clamp bolt 40 which is threaded at the upper end in FIG. 1 and engages a threaded end block 42. At the opposite end of clamp bolt 40 has miter gear 44 attached thereto. Pins 43 fastened to the end block engage slots in each of the jaws 16 to permit relative radial movement, but to prevent relative rotation. It will be noted that rotation of the clamp bolt 40 with respect to the mandrel 20 will move the end block 42 selectively along the axis of the mandrel. This will force the clamp jaws outwardly to secure and concentrically support the mandrel in the tube to be seal welded. The mandrel 20 is restrained from rotating with respect to the weld head body 28 at this time by the drive means which will be described hereinafter. Manual rotation of tightening nut 46 including a miter gear will therefore operate to secure the apparatus in the tube. While the weld head body will rotate around the clamp bolt 40 in operation it is not necessary to withdraw the tightening nut 46 out of engagement. Since the friction restraining rotation of the tightening nut 46 is so slight compared to the force required to loosen the clamp bolt, it will freely rotate in operation. If desired, means may be provided to withdraw tightening nut 46, for added assurance. The spindle may be used for any tube diameter merely by changing to different size jaws.

The rotation motor 32 is attached to the weld head body 28. A planet gear 48 is operatively attached to the rotor of rotation motor 32 through a planetary gear reduction to give the desired speed. This planet gear 48 is arranged to engage sun gear 26. As the rotation motor 32 is operated the planet gear meshing with the sun gear walks the weld head body 28 around the mandrel 20.

The weld torch 38 is supported in journal bearing 36 in a manner which permits rotation around the journal bearing and movement of the torch tip in the direction generally radial to the mandrel 20 and also the tube to be welded. The torch is held in a selected radial position and oscillated as desired. To accomplish this the end of the torch which is opposite the tip is supported by clamp 50, bell crank 52, and axle 54. The oscillator motor 34 is attached to the weld head body 28 with its axis parallel to that of the mandrel 20. This motor also includes a planetary gear reduction to give the desired speed and provides the desired linear motion of the torch from the rotary motion of the motor by operating through connecting rod 56. This connecting rod engages axle 54 through ball socket joint 58 and engages the eccentric drive 60 of the oscillator motor 34 through ball socket 62. The speed of oscillation is varied by changing the speed of the oscillator motor. The starting position of the torch may be adjusted by loosening clamp 50 and displacing the clamp axle 54 inwardly or outwardly from the oscillator. The amplitude of oscillation is changed by adjusting the eccentric stroke displacement of the eccentric drive 60.

The torch 38 is a MIG type having a metal arc and using inert gas for shielding. The weld rod 70 is fed from spool 72 while inert gas is supplied through supply line 74. Cooling water and electric current are supplied through line 76 while cooling water exit through line 78. Components of the MIG torch assembly are conventional. Since the inside surface of the header is curved, the distance of the torch tip from the header surface will change as it rotates around the mandrel center line. The use of the MIG welding process automatically compensates for this since the electrode will melt back to the proper distance at all times. Since the variation in distance is relatively small, there is no need to provide any means for moving the tip of the torch toward and away from the surface of the header during the rotation.

In operation the apparatus is assembled outside the header, passed through the 4 inch handhole, and placed in position with the clamp jaws 16 within the tube to be seal welded. The apparatus is positioned so that the tip of welding torch 38 is at least one-fourth inch from the work. Tightening nut 46 is turned to lock the apparatus in place.

This one-fourth inch spacing is the necessary stand-off distance which the torch tip must be away from the work in order that the MIG process will operate properly.

The filler wire is threaded through conventional feeder mechanism and through the torch. Conventional control of power supply sources are used and by initiating the arc start button the weld process will start, weld for the proper time, and stop without manual manipulation of the torch during the cycle. The torch will operate through a full 360° arc thereby completing the entire seal weld. The speed of rotation is adjusted by adjusting the speed of rotation motor 32. Oscillation of the torch is accomplished through the means previously described. This oscillation moves the torch tip between the edge of the tube to be welded and the inside surface 14 of the header thereby providing more effective sealing and better tolerance against pin-hole leaks while still minimizing the total heat input to the header. The oscillator provides for a much wider weld head width than could be possible with a non-oscillating torch. The oscillation also stirs the molten metal to provide for more complete gas release.

The radial spacing of the rotation motor 32, the oscillator motor 34 and the torch 38 permits a compact arrangement of this apparatus which may be passed in through the small 4 inch diameter opening for use inside the header.

What is claimed is:

1. An apparatus for seal welding a tube to the inside surface of a header comprising:
    a. a welding torch having a tip;
    b. a mandrel having an axis;
    c. centering means for concentrically supporting said mandrel from the tube to be seal welded;
    d. a journal bearing supporting said welding torch, with the welding torch tip adjacent the tube end to be seal welded, while permitting torch tip movement generally radial to the axis of said mandrel;
    e. support means rotatably mounted on said mandrel for supporting said journal bearing;
    f. a first electric motor supported on said support means with its axis parallel to the axis of said mandrel for rotating said support means around the axis of said mandrel, a planet gear operatively attached to the rotor of said first electric motor and a meshing sun gear rigidly attached to said mandrel; and
    g. oscillating means for oscillating said torch about the axis of said journal bearing.

2. An apparatus as in claim 1 wherein said oscillating means comprises a second electric motor supported on said support means with its axis parallel to the axis of said mandrel.

3. An apparatus as in claim 2 wherein said torch and the electric motors of said first and second motors are circumferentially displaced around the central axis of said mandrel.

4. An apparatus as in claim 3 wherein said welding torch comprises a gas metal arc welding torch.

5. An apparatus as in claim 4 having an outer spatter shield comprising an annular disc having a slot therein through which said welding torch passes, surrounding said mandrel at a location between the welding location and the location of said sun gear and free to rotate on said mandrel.

* * * * *